US011906690B2

(12) United States Patent
Inanc et al.

(10) Patent No.: US 11,906,690 B2
(45) Date of Patent: Feb. 20, 2024

(54) OBTAINING INELASTIC SPECTRA FREE OF DETECTOR BORN GAMMA RAYS INDUCED BY NEUTRONS

(71) Applicant: Baker Hughes Oilfield Operations LLC, Houston, TX (US)

(72) Inventors: Feyzi Inanc, Houston, TX (US); Toyli Anniyev, Houston, TX (US); Peng Yuan, Houston, TX (US); Maxim Vasilyev, Houston, TX (US); David Chace, Houston, TX (US)

(73) Assignee: BAKER HUGHES OILFIELD OPERATIONS LLC, Houston, TX (US)

( * ) Notice: Subject to any disclaimer, the term of this patent is extended or adjusted under 35 U.S.C. 154(b) by 755 days.

(21) Appl. No.: 16/596,871

(22) Filed: Oct. 9, 2019

(65) Prior Publication Data

US 2020/0116891 A1 Apr. 16, 2020

Related U.S. Application Data

(60) Provisional application No. 62/743,831, filed on Oct. 10, 2018.

(51) Int. Cl.
*G01V 5/10* (2006.01)
*G01V 5/04* (2006.01)
(Continued)

(52) U.S. Cl.
CPC ............... *G01V 5/045* (2013.01); *G01T 3/06* (2013.01); *G01V 5/12* (2013.01)

(58) Field of Classification Search
CPC .......... G01V 5/045; G01V 5/12; E21B 47/12; G01T 3/06
See application file for complete search history.

(56) References Cited

U.S. PATENT DOCUMENTS 5,406,078 A * 4/1995 Jacobson ............... G01V 5/101
250/261
2003/0178573 A1 9/2003 Craig
(Continued)

FOREIGN PATENT DOCUMENTS

WO 2014/186276 11/2014

OTHER PUBLICATIONS

International Search Report and Written Opinion dated Jan. 9, 2020 in corresponding PCT Application No. PCT/US19/55491.

*Primary Examiner* — John E Breene
*Assistant Examiner* — Christine Y Liao
(74) *Attorney, Agent, or Firm* — Hogan Lovells US LLP (57) ABSTRACT

In an embodiment, a method includes receiving a first measurement of gamma rays via a detector during a first period of time, receiving a second measurement of gamma rays via the detector during a second period of time, removing the second measurement from the first measurement to produce an inelastic spectrum, determining a spectral slope from the inelastic spectrum, determining a scaling factor based on the spectral slope, determining a spectral shape associated with the detector, determining a detector-induced spectrum by applying the scaling factor to the spectral shape, and removing the detector-induced spectrum from the inelastic spectrum to produce a clean inelastic spectrum.

20 Claims, 9 Drawing Sheets

(51) Int. Cl.
*G01T 3/06* (2006.01)
*G01V 5/12* (2006.01)

(56) References Cited

U.S. PATENT DOCUMENTS

| | | | |
|---|---|---|---|
| 2006/0065824 A1 | 3/2006 | Mickael | |
| 2010/0193676 A1* | 8/2010 | Jacobson | G01V 5/102 |
| | | | 250/269.6 |
| 2012/0197529 A1 | 8/2012 | Stephenson | |
| 2013/0211724 A1 | 8/2013 | Fitzgerald | |
| 2016/0349399 A1* | 12/2016 | Zhou | G01V 5/102 |
| 2017/0227671 A1* | 8/2017 | Zhou | G01V 5/102 |

\* cited by examiner

OBTAINING INELASTIC SPECTRA FREE OF DETECTOR BORN GAMMA RAYS INDUCED BY NEUTRONS

CROSS REFERENCE TO RELATED APPLICATIONS

This application claims priority to U.S. Patent Application No. 62/743,831 filed Oct. 10, 2018 titled "OBTAINING INELASTIC SPECTRA FREE OF DETECTOR BORN GAMMA RAYS INDUCED BY NEUTRONS", the disclosure of which is incorporated herein by reference in its entirety.

BACKGROUND

1. Field of Invention

This invention relates in general to equipment used in the hydrocarbon industry, and in particular, to a device and method for use in analyzing formations through nuclear logging.

2. Description of the Prior Art

Nuclear spectroscopy is typically based on gamma ray energy spectra recorded by scintillation detectors. In certain applications, such as high energy neutron driven nuclear spectroscopy, it can be difficult to obtain inelastic spectra that are free of gamma rays induced in the detector by the neutrons incident on the detector. The prompt gamma rays born in the detector crystal through neutron reactions usually result in the distortion of the inelastic spectrum. In some instances, such as if the measurement is based on a single detector reading such as C/O, neutron induced spectroscopy, the impact of this can be large because the spectrum shape changes with the shape and magnitude of the neutron flux incident on the detector. In other instances, such as when the measurements are based on the ratio of readings from two detectors, the impact of the detector born gamma rays may be smaller due to both detectors being influenced in the same manner.

SUMMARY

In an embodiment, a method includes receiving a first measurement of gamma rays via a detector during a first period of time, receiving a second measurement of gamma rays via the detector during a second period of time, removing the second measurement from the first measurement to produce an inelastic spectrum, determining a spectral slope from the inelastic spectrum, determining a scaling factor based on the spectral slope, determining a spectral shape associated with the detector, determining a detector-induced spectrum by applying the scaling factor to the spectral shape, and removing the detector-induced spectrum from the inelastic spectrum to produce a clean inelastic spectrum. In some embodiments, the first period of time corresponds to a burst gate and the first measurement corresponds to a total spectrum. In some embodiments, the second period of time corresponds to a capture gate and the second measurement corresponds to capture gamma rays. In some embodiments, the method further includes determining a higher gamma count rate from a first segment of the gamma ray spectrum, determining a lower gamma count rate from a second segment of the same gamma ray spectrum, and comparing the higher count rate and the lower count rate to determine the spectral slope. In some embodiments, the method further includes obtaining a correlation between the spectral slope and the scaling factor. In some embodiments, the detector comprises a crystal, and the detector-induced spectrum is associated with characteristics of the crystal.

In another embodiment, a computing device includes a microprocessor and memory including instructions that, when executed by the microprocessor, cause the computing device to: receive a first measurement of gamma rays via a detector during a first period of time, receive a second measurement of gamma rays via the detector during a second period of time, remove the second measurement from the first measurement to produce an inelastic spectrum, determine a spectral slope from the inelastic spectrum, determine a scaling factor based on the spectral slope, determine a spectral shape associated with the detector, determine a detector-induced spectrum by applying the scaling factor to the spectral shape, and remove the detector-induced spectrum from the inelastic spectrum to produce a clean inelastic spectrum. In some embodiments, the first period of time corresponds to a burst gate and the first measurement corresponds to a total spectrum. In some embodiments, the second period of time corresponds to a capture gate and the second measurement corresponds to capture gamma rays. In some embodiments, the instructions, when executed by the microprocessor, further cause the computing device to: determine a higher gamma count rate from a first segment of the gamma ray spectrum, determine a lower gamma count rate from a second segment of the gamma ray spectrum; and compare the higher count rate and the lower count rate to determine the spectral slope. In some embodiments, the instructions, when executed by the microprocessor, further cause the computing device to: obtain a correlation between the spectral slope and the scaling factor. In some embodiments, the detector comprises a crystal, and the detector-induced spectrum is associated with characteristics of the crystal.

In another embodiment, a system for conducting measurement operations includes a neutron measurement device forming at least a portion of a downhole tool string, the neutron measurement device operable to generate measurement data for detecting a wellbore characteristic, wherein the neutron measurement device includes a neutron generation unit operable to emit neutrons toward a target, and a detector unit fixed relative to the neutron generator and operable to detect gamma rays from the target. The system also includes a microprocessor, and memory including instructions that, when executed by the microprocessor, cause the system to receive a first measurement of gamma rays via a detector during a first period of time, receive a second measurement of gamma rays via the detector during a second period of time, remove the second measurement from the first measurement to produce an inelastic spectrum, determine a spectral slope from the inelastic spectrum, determine a scaling factor based on the spectral slope, determine a spectral shape associated with the detector, determine a detector-induced spectrum by applying the scaling factor to the spectral shape, and remove the detector-induced spectrum from the inelastic spectrum to produce a clean inelastic spectrum. In some embodiments, the first period of time corresponds to a burst gate and the first measurement corresponds to a total spectrum. In some embodiments, the second period of time corresponds to a capture gate and the second measurement corresponds to capture gamma rays. In some embodiments, the instructions, when executed by the microprocessor, further cause the computing device to determining a higher gamma count rate from a first segment of the gamma ray spectrum, determining a lower gamma count rate from a second specific segment of the gamma ray spectrum, and comparing the higher count rate and the lower count rate to determine the spectral slope. In some embodiments, the instructions, when executed by the microprocessor, further cause the computing device to obtain a correlation between the spectral slope and the scaling factor. In some embodiments, the detector comprises a crystal, and the detector-induced spectrum is associated with characteristics of the crystal. In some embodiments, the neutron generation unit is a pulsed neutron generator. In some embodiments, the detector unit includes at least one gamma ray detector.

DETAILED DESCRIPTION OF THE INVENTION

The foregoing aspects, features and advantages of the present technology will be further appreciated when considered with reference to the following description of preferred embodiments and accompanying drawings, wherein like reference numerals represent like elements. In describing the preferred embodiments of the technology illustrated in the appended drawings, specific terminology will be used for the sake of clarity. The present technology, however, is not intended to be limited to the specific terms used, and it is to be understood that each specific term includes equivalents that operate in a similar manner to accomplish a similar purpose.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments. Additionally, it should be understood that references to "one embodiment", "an embodiment", "certain embodiments," or "other embodiments" of the present invention are not intended to be interpreted as excluding the existence of additional embodiments that also incorporate the recited features. Furthermore, reference to terms such as "above," "below," "upper", "lower", "side", "front," "back," or other terms regarding orientation are made with reference to the illustrated embodiments and are not intended to be limiting or exclude other orientations.

Embodiments of the present disclosure are directed to systems and methods for obtaining pure inelastic spectrum in gamma ray detection. As a result, measurement quality is improved with regard to the inelastic spectrum. For example, in various embodiments, a pulsed neutron generator may be utilized to interrogate a formation with high energy neutrons. The high energy neutrons may interact with the formation and generate inelastic scattering gamma rays, which may be detected by a plurality of detectors, such as gamma ray detectors. As the high energy neutrons interact with various formation components, they may lose energy and become thermal neutrons, which may be absorbed by a certain components of the formation. These components may emit prompt capture gamma rays, which may also be detected by the plurality of radiation detectors. In certain embodiments, the pulse periods between emissions of high energy neutrons may be extended to enable thermalization of the high energy neutrons and absorption, thereby reducing the likelihood that prompt capture gamma detection will obscure detection of inelastic scattering gamma rays during the burst gate. In various embodiments, a burst period of time is particularly selected to be less than a thermalization period for high energy neutrons. As a result, a majority of the gamma rays detected during the burst gate will correspond to inelastic scattering reactions. Thereafter, thermal neutron capture may be analyzed. A delay period between pulses may correspond to a period of time for the thermal neutrons to be absorbed above a predetermined threshold. Accordingly, lingering thermal neutrons in the formation may be reduced. As a result, subsequent pulse periods may be correlated to substantially include gamma rays as a result of inelastic scattering, without detecting prompt gammas from previously existing thermal neutrons. To this end, a pure inelastic spectrum may be determined. Furthermore, in various embodiments, data acquisition may be delayed such that the inelastic gamma ray pulse height waveforms acquired during the burst gate are stored and later processed or evaluated during the capture gate. Moreover, data acquired during the capture gate may be analyzed in real time or near-real time.

Figure 1:
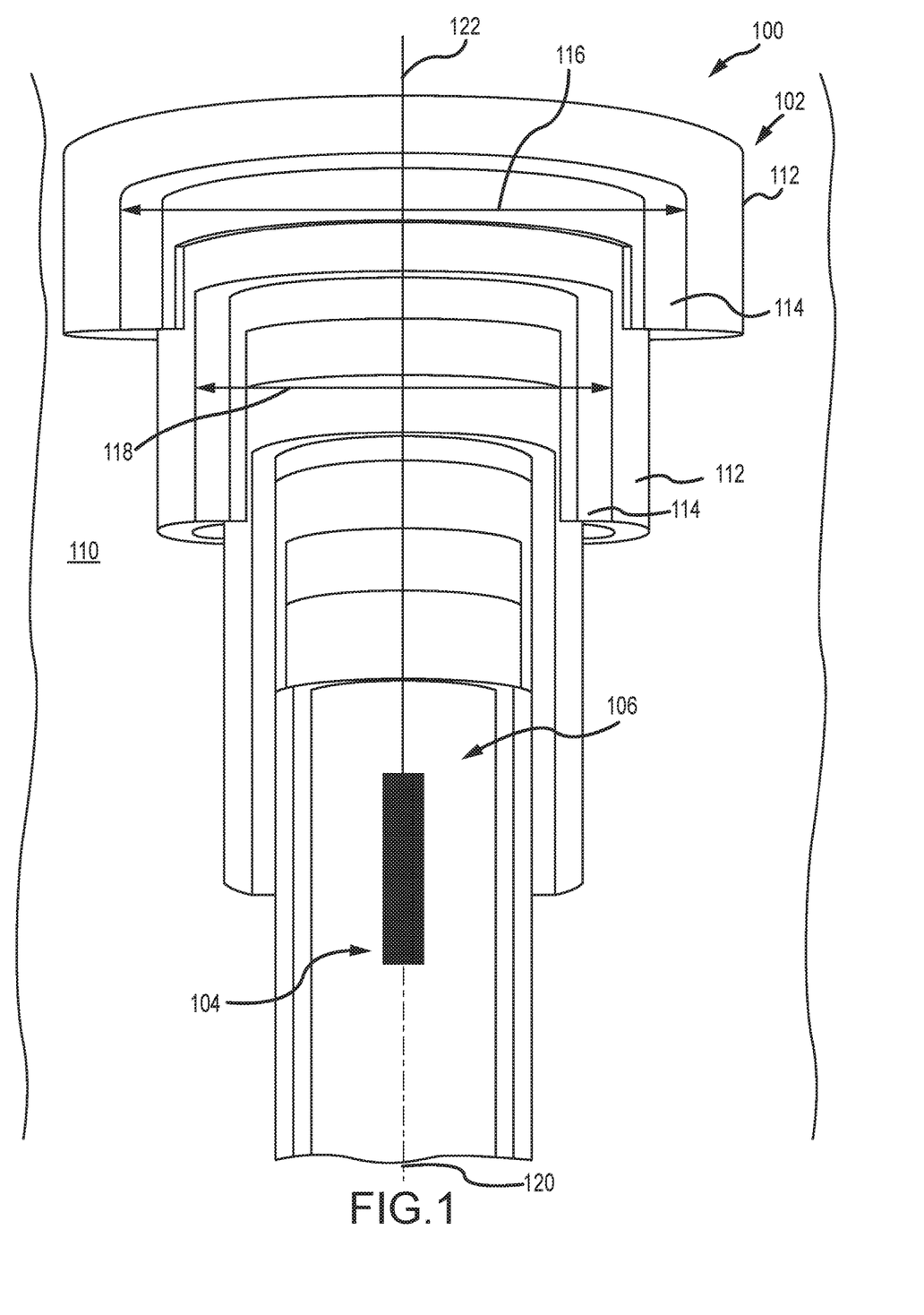
FIG. 1 is a partial cross-sectional view of a wellbore environment, in accordance with various embodiments.

FIG. 1 is a partial cross-sectional view of a wellbore environment 100 illustrating a multi-barrier well structure 102 and a measurement system 104 arranged as at least a portion of a downhole tool string 106. It should be appreciated that, as used herein, the tool string 106 may refer to one or more downhole tools coupled to a conveyance system that enables logging, perforating, drilling, wellbore intervention, or the like. In various embodiments, the measurement system 104 may be utilized to detect abnormalities or potential defects within a wellbore 108, to determine characteristics of a formation 110, to determine fluid saturation in the formation pore space, or the like. In the illustrated embodiment, the measurement system 104 may include a neutron measurement device configured to interrogate the formation 110 and/or the multi-barrier well structure 102 with neutrons e.g., fast neutrons having energy of approximately 14.1 MeV upon emission from a neutron generator, which may be a pulsed neutron generator) and later detect radiation such as neutron induced capture and inelastic gamma rays, neutrons, or the like.

In the illustrated embodiment, the well structure 102 includes a series of tubular casings 112, which may be metallic, and cement walls 114 between the casings 112. Often, when drilling hydrocarbon wells, a first wellbore diameter 116 is larger than a second wellbore diameter 118. In other words, as the wellbore 108 gets deeper, the diameter decreases. In various embodiments, the wellbore 108 may be cased, as in, lined by the tubular casings 112 and held into place against the formation 110 and/or other casing sections via cement forming the cement walls 114. It may be desirable to inspect the integrity of the casing 112 and/or the cement walls 114, for example for potential abnormalities or defects such as mud channel defects, bonding defects, air voids, defects in the casing, eccentricity of the well. In various embodiments, the defects may be categorized such as annulus defects, casing defects, casing eccentricity, cement bonding defects, and fluid channel defects, among others. These abnormalities or defects may be referred to as wellbore characteristics and may further include additional information such as formation properties and the like. Furthermore, it should be appreciated that, while the illustrated embodiment may include the well structure 102, embodiments of the present disclosure may be used in a non-cased wellbore 108. Additionally, embodiments of the present disclosure may be utilized to determine properties of the wellbore formation, or the like, and reference to detection of anomalies or defects is for illustrative purposes only.

In the illustrated embodiment, the measurement system 104 traverses into the wellbore 108 along a wellbore axis 120 supported by a wireline 122, which may be a cable reinforced for wellbore operations and further including conductive materials to transfer energy and data signals. It should be appreciated that while a wireline system is illustrated in FIG. 1, embodiments of the present disclosure may be disposed on rigid tubing, coiled tubing, and with various other wellbore tubing structures. In various embodiments, the measurement system 104 can determine the integrity of each of the barriers (e.g., casings) of the multi-barrier well and/or the plurality of annuli between the barriers. Further, in various embodiments, the measurement system 104 may obtain measurements indicative of various wellbore or formation properties. The measurement system 104 is deployed at the different depths inside the wellbore 108, and therefore has material and structural integrity to withstand the high pressures and high temperatures at these depths.

It should be appreciated that various embodiments discussed herein describe the measurement system 104 is a neutron measurement tool, which may include a neutron generation unit and a detection unit, which may include radiation detectors to detect a variety of radiation, such as gamma rays, neutrons, and the like. The neutron generation unit may emit a flux of neutron radiation into the formation 110, which may interact with one or more targets and produce a stream of neutron induced gamma rays, neutrons, or the like toward the detection unit. In various embodiments, the neutron generation unit is a pulsed neutron generator that emits neutrons for a period of time and then stops emitting neutrons. For example, the pulsed neutron generator may be a D-D or D-T generator that emits neutrons for approximately 60 microseconds and then stops emitting neutrons for a period of time. As a result, in various embodiments where the neutron generation unit is a pulsed neutron generator, the formation may be initially flooded with high energy fast neutrons, which may be referred to as the burst gate, and then contain predominantly (or entirely in certain embodiments) thermal neutrons during what may be referred to as a thermal gate or capture gate. The neutron detection unit may include a plurality of detectors that detect the presence of backscattered radiation, for example in the form of gamma rays. The detection of the radiation may be referred to as nuclear measurement data and may be utilized to detect the wellbore characteristics. Moreover, the measurement system 104 may include numerous interrogation modalities, each having an excitation assembly for generating the respective beam or signal to make various wellbore measurements. The wellbore measurement information from each measurement modality may be analyzed and fused with data from other measurement modalities. These modalities may include gamma ray, acoustic, electromagnetic measurement modalities. Data from all or a subset of these modalities may be analyzed and data fused in various combinations to gain additional insight and remove confounding factors.

Figure 2:
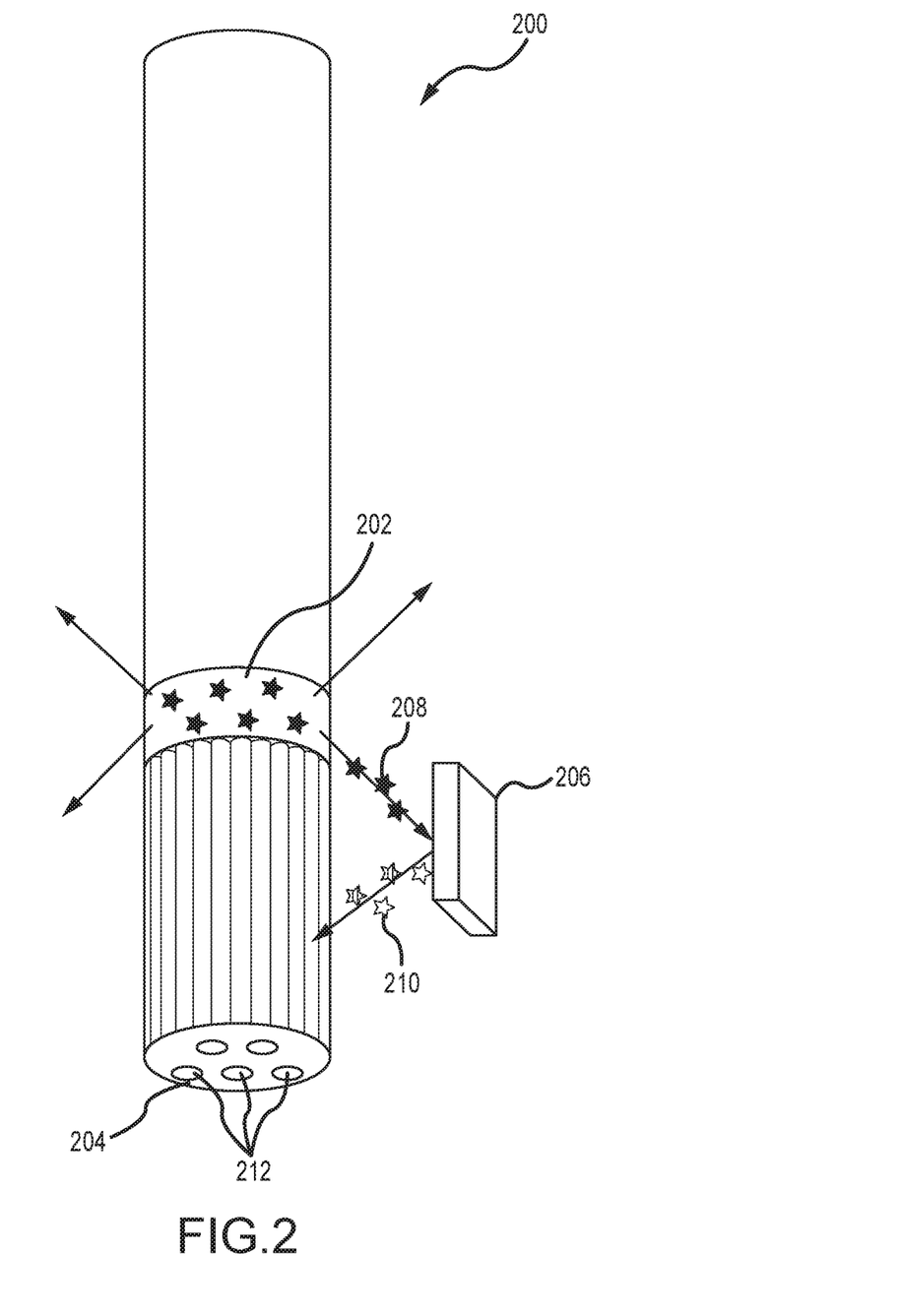
FIG. 2 is a schematic perspective view of an embodiment of a neutron measurement device, in accordance with various embodiments.

FIG. 2 is a schematic perspective view of an embodiment of a neutron measurement device 200, which may be the measurement system 104. The illustrated neutron measurement device 200 includes a neutron generation unit 202 and a detection unit 204, which in various embodiments, may be configured to detect various types of radiation, such as gamma rays, x-rays, neutrons, or the like. As discussed above, in various embodiments, the neutron generation unit 202 is a pulsed neutron generator that emits neutrons for a period of time and then stops emitting neutrons for a second period of time. In the illustrated embodiment, the detection unit 204 is fixed relative to the neutron generation unit 202. That is, movement of the neutron generation unit 202 will also be associated with equal movement of the detection unit 204. In various embodiments, the generation unit 302 includes one or more neutron generators to produce neutrons at an energy of approximately 14.1 MeV, which may be termed "fast" neutrons. In embodiments, the neutron generator unit 202 is a pulsed generator that emits a neutron beam for a period of time, ceases to emit the neutron flux for a period of time, and then emits the neutron flux for a period of time. For example, the high-energy radiation (e.g., DD or DT neutrons) may be emitted from the generation unit 202 toward a target 206, such as a portion of the casing 112, portion of the cement wall 114, portion of the formation 110, or any other reasonable downhole feature. The radiation may be emitted for periods of time to enable accumulation of certain types of radiation. For example, as fast neutrons undergo elastic scattering, energy is lost and the neutrons may become thermal neutrons (e.g., neutrons with energy less than 0.8 eV), which may be captured. Neutron capture reactions are accompanied by the emission of capture gamma rays. In various embodiments, the fast neutrons may interact with other nuclei in the formation, leading to inelastic scattering, which may be associated with emission of inelastic gamma rays. Additionally, (n,p) and (n,γ) reactions by the neutrons in the formation 110 may result in unstable nuclei that may decay with emission of activation gamma rays. In embodiments, the detection unit 204 may detect the gamma rays, neutrons, or the like. For simplicity in the following discussion, detection with respect to gamma rays associated with inelastic scattering and capture gamma rays will be discussed herein. Initially, a majority of the neutrons will be fast neutrons, but over time, the fast neutrons will lose energy, for example due to interactions, and become thermal neutrons. The initial load of fast neutrons may be referred to as a burst gate while the later periods with predominantly (or entirely) thermal neutrons may be referred to as a thermal gate or capture gate.

In the illustrated embodiment, a neutron flux 208 may be transmitted radially outward from the generation unit 202. It should be appreciated that, initially, the neutron flux 208 may be mostly high energy, fast neutrons that will interact and thermalize over time. However, some of the fast neutrons may thermalize very quickly, and as a result, the neutron flux 208 may include a combination of both fast and thermal neutrons.

In various embodiments, the neutron flux 208 is a circumferential flux moving radially outward from the generation unit 202. However, in various embodiments, the neutron flux 208 may be directed or otherwise targeted toward a particular location. The neutrons forming the neutron flux 208 interact with the target 206 and a backscatter 210 is produced as a result of the interactions. The backscatter 210 may refer to gamma rays formed through inelastic collisions, thermal neutron capture, and the like. It should be appreciated that, in various embodiments, there may be greater amounts of inelastic gamma rays near the start of or during the burst gate, as the high energy neutrons from the neutron generation unit 202 may cause significant inelastic collision, and then as the neutrons thermalize, capture reactions may take place to release the capture gammas.

In various embodiments, the detection unit 204 includes one or more radiation detectors 212 that may detect gamma rays, neutrons, or the like. For example, in embodiments where gamma rays are being detected, the detectors 212 may include scintillation counters (e.g., thallium-doped sodium iodide, BGO, LaBr3, etc.), and the like. It should be appreciated that the various detectors 212 may be calibrated for use within the downhole environment or to detect energy levels within a specific spectrum. Furthermore, there may be a plurality of detectors within the detection unit 204. It should be appreciated that the type of gamma ray may not be readily determined by the detector 212, and therefore, analysis of various energy peaks is utilized to determine likely properties associated with the wellbore. For example, certain energy levels are associated with capture gamma rays released as a result of capture of neutrons by certain nuclides. Embodiments of the present disclosure may facilitate ready detection of energy peaks associated with different portions of data collection (e.g., burst gate and capture gate) and therefore may provide improved data collection and analysis information.

During operation, neutrons may be emitted from the neutron generation unit 202 in an isotropic manner. Over time (e.g., 8-50 microseconds) neutrons may be reduced from an initial fast energy level (e.g., 14.1 MeV) to approximately thermal energy levels (e.g., less than 0.8 eV). These thermal neutrons may then be captured by various components of the wellbore, which may produce prompt gamma rays that may be detected by the detection unit 204.

The system of the present disclosure provides for obtaining an inelastic spectrum free of the gamma rays born in the detector. In practice, high energy neutrons may originate from either chemical neutron sources such as AmBe or Cf252 sources, or from D-D and D-T generators. A typical D-T pulsed neutron generator used in the oil field services industry can emit about 14.1 MeV neutrons that can induce gamma ray emission through both inelastic and capture reactions in the environment surrounding the neutron source. While pulsed mode operation enables neutrons to slow down to thermal neutron levels after a neutron burst gate, and gamma rays are produced from associated neutron capture reactions, recording a pure inelastic gamma ray spectrum can be difficult because recorded gamma rays in the burst gate are a mixture of gamma rays emitted through inelastic reactions and capture reactions.

There are many measurements in nuclear logging where an inelastic gamma ray spectrum is beneficial, such as, for example, in neutron induced gamma ray based mineralogy work, C/O measurements, and others. The quality of the inelastic spectrum plays a role in these and other measurements.

Figure 3:
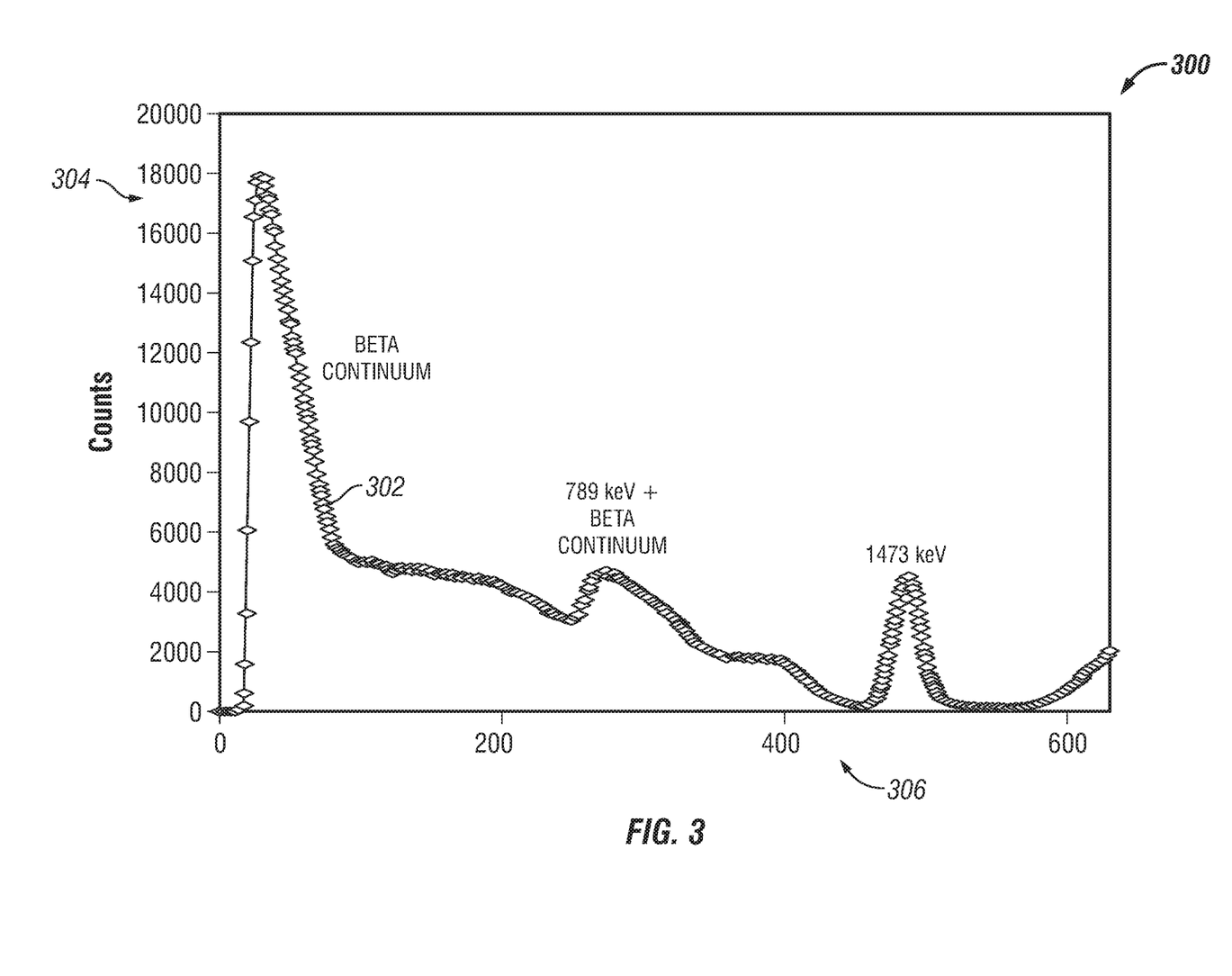
FIG. 3 is a plot illustrating a measure of a constant background of gamma rays from a $LaCl_3$ detector, in accordance with various embodiments.

In certain circumstances, it can occur that the detector scintillator itself emits gamma rays and then records those as a part of the spectrum. This can happen various ways. For example, some crystals have elements that are not stable and can decay with the emission of gamma rays. This process forms a constant background of gamma rays emitted by the crystal and then recorded by the crystal. FIG. 3 is a plot 300 illustrating a measure of a constant background of gramma rays 302 from an $LaCl_3$ detector, specifically the gamma counts 304 with respect to energy level 306. If this crystal is to be used for measuring gamma rays in this energy interval, it could be difficult to analyze the data because background would degrade the measured data.

In another example, gamma rays can be emitted inside the crystal due to interaction of incident neutrons with the crystal material. Such reactions can drive inelastic gamma rays and/or capture gamma rays. For example, some detectors come with oxygen in the crystal. With such crystals, O-16 inelastic gamma rays can be emitted in the crystal due to inelastic scattering of very fast neutrons from O-16 nuclei, and such gamma rays can be subsequently recorded. In addition to inelastic gamma rays, there can also be prompt capture gamma rays through neutron capture. These capture reactions can happen at both low and high energy levels. Microscopic capture cross sections of some relevant nuclei are shown in FIG. 4.

Figure 4:
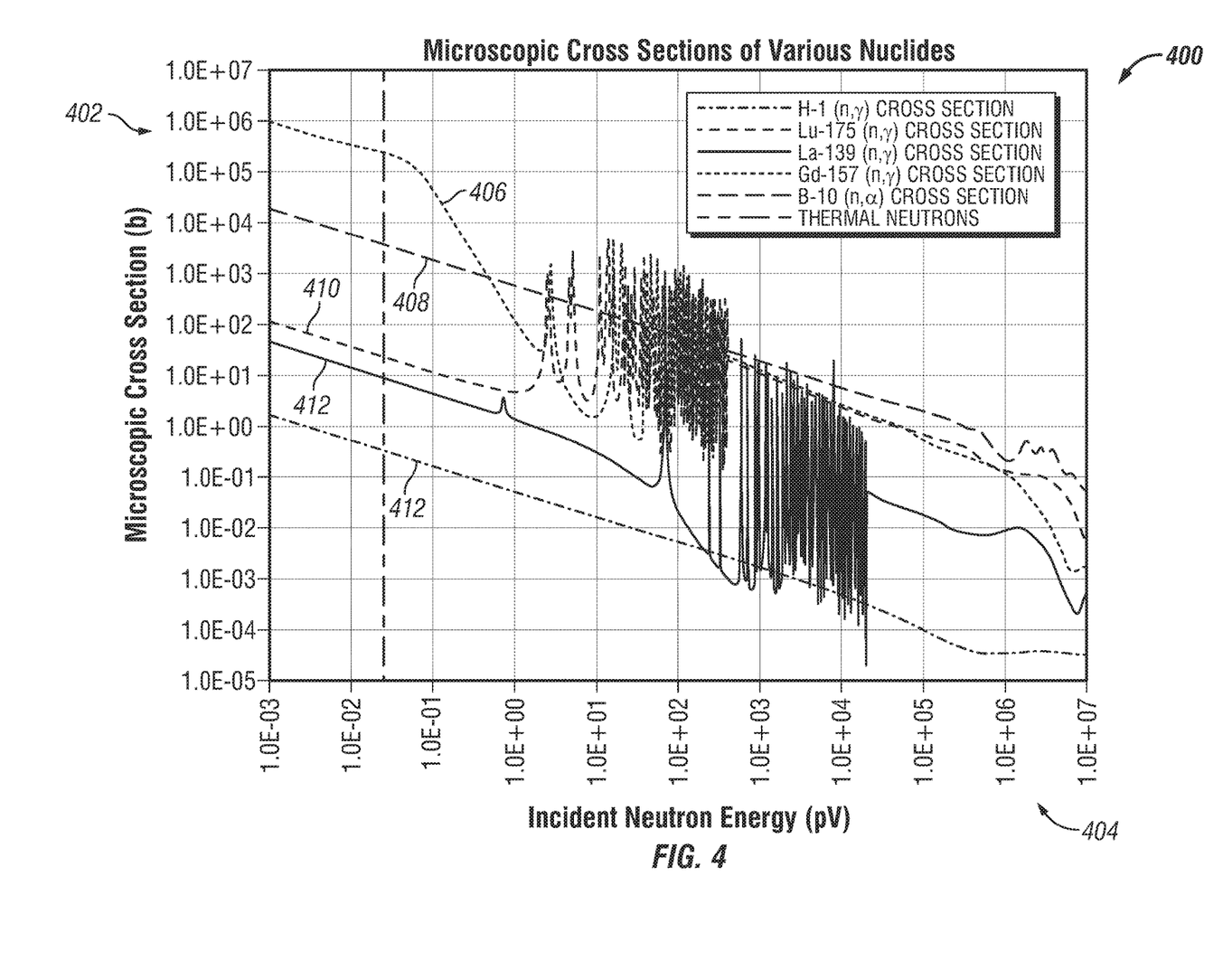
FIG. 4 is a plot illustrating the (n,γ) cross sections of various nuclides, in accordance with various embodiments.

FIG. 4 is a plot 400 illustrating the (n,γ) cross sections 402 of H-1 (line 414), Lu-175 (line 410), La-139 (line 412), Gd-157 (line 406), and the (n,α) cross sections of B-10 (line 408) with respect to incident neutron energy 404. As shown, the general behavior of cross sections is to decrease with increasing energy. Except H-1 (line 414) and B-10 (line 408), all have resonance behavior between 11-10,000 eV energy ranges. In general, capture cross sections are very high in the thermal neutron energy vicinity. That is especially true for Gd-157 (line 406). Some scintillators such as $LaCl_3$, $LaBr_3$, GYSO, GSO, LYSO, LuAg have such nuclides in their material composition. All those nuclides will emit prompt gamma rays when they capture neutrons.

Figure 5:
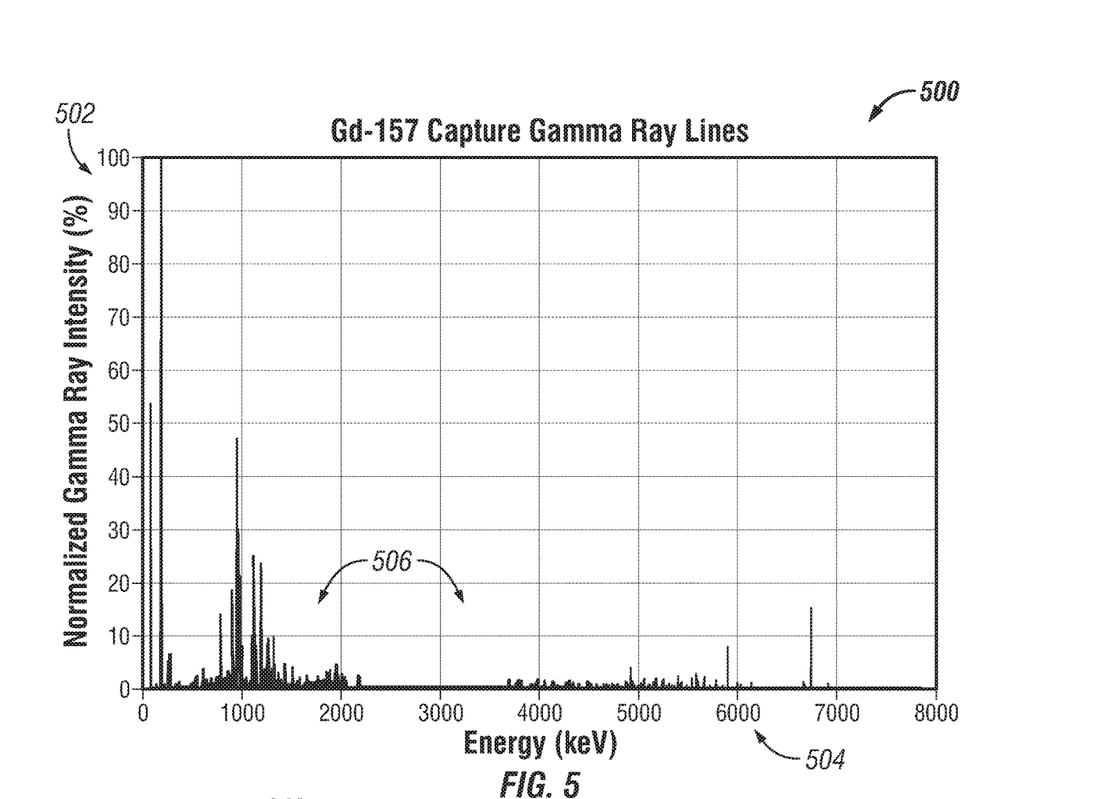
FIG. 5 illustrates the gamma emission lines for Gd-157, in accordance with various embodiments.

FIG. 5 is a plot 500 illustrating the neutron capture prompt gamma emission lines 506 of Gd-157, specifically the normalized gamma ray intensity 502 with respect to energy 504. It follows that there is typically prompt capture gamma rays not only from the thermal neutrons, but also from relatively high energy neutron capture events as well.

The amount of higher energy capture gamma rays varies with two factors. One is how high the neutron capture cross sections are in the higher energy zones. Referring back to FIG. 4, it is shown that Lu-175 (line 410) and Gd-157 (line 406) have relatively high capture cross sections in the keV range and higher. In that zone, capture cross sections of those two are about one order of magnitude higher compared to La-139 (line 412), but at a level comparable to B-10 (n,α) (line 408) cross sections. This indicates that scintillation crystals having gadolinium and lutetium will be subjected to significant levels of (n,γ) reactions with high energy neutrons, while lower levels of (n,γ) reactions are expected for lanthanum containing crystals due to the relatively low cross section in the higher energy zone of lanthanum.

The second factor affecting the amount of higher energy capture gamma rays is the magnitude of emission of prompt gamma rays and their energy levels. Those change with the nuclide capturing the neutrons. FIG. 5 shows the gamma emission lines 506 for Gd-157. As shown, although there is a significant amount of gamma ray emission below 2000 keV, there is not much up to 4000 keV range. For a detector with gadolinium, many neutron induced gamma rays should be expected in the 3000-6800 keV range. Some of these can overlap with the data coming from carbon, silicon, oxygen, iron, magnesium and others.

One goal in pulsed neutron generator driven neutron gamma spectroscopy is to obtain an inelastic spectrum free of gamma rays from thermal neutrons and gamma rays born in the crystal. Inelastic spectrum is obtained from the total spectrum measured in the burst gate. The measured total spectrum is made up of different components depending on the detector type and tool configuration. Some are discussed below.

Figures 6A, 6B:
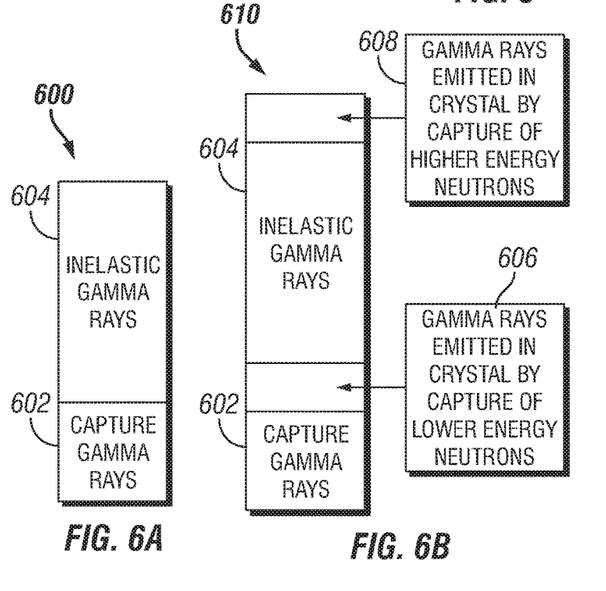
FIG. 6A is a graphical representation of a total spectrum that has a negligible level of neutron induced gamma ray components, in accordance with various embodiments.
FIG. 6B is a graphical representation of a total spectrum that has crystal-born gamma components, in accordance with various embodiments.

For example, FIG. 6A shows a graphical representation of a total spectrum 600 that has a negligible level of neutron induced gamma ray components. In such cases, the total spectrum 600 is made up of capture gamma rays 602 and inelastic gamma rays 604 coming from outside the tool. In this instance, obtaining inelastic spectrum can be achieved by simply subtracting or removing the capture gamma ray spectrum 602 measured in the capture gate from the total spectrum 600 after it has been multiplied by a scaling factor. Conventional NaI crystal can be an example for such case because the neutron induced gamma rays in this crystal is negligibly small.

The second case, shown in FIG. 6B, is a more difficult case because the total spectrum 610 is made up of not only the capture gamma rays 602 and inelastic gamma rays 604 coming from the outside of the tool, but also gamma rays 606 induced by the lower energy neutrons in the crystal and gamma rays 608 induced by higher energy neutrons in the crystal. The definition of lower and higher energy neutrons is related to the energy spectrum of the neutrons in the capture gates. If the neutron energy levels are higher than this capture gate spectrum, they are higher energy neutrons.

If the method described above with respect to FIG. 6A were used for case in FIG. 6B, it would be insufficient for obtaining a clean inelastic spectrum. This is because the thermal gate energy spectrum includes capture gamma rays 602 from the outside world as well as the capture gamma rays 606 induced in the crystal by the lower energy neutrons. In other words, the thermal gate spectrum is made up of the lower two components shown in FIG. 6B. Therefore, if thermal gate spectrum is subtracted from the total spectrum 610 after scaling, it will take only the bottom two components from the four-piece structure shown in FIG. 6B. The resulting inelastic spectrum is heavily doped by the features of the gamma rays 608 induced in the crystal by higher energy neutrons.

Figure 7:
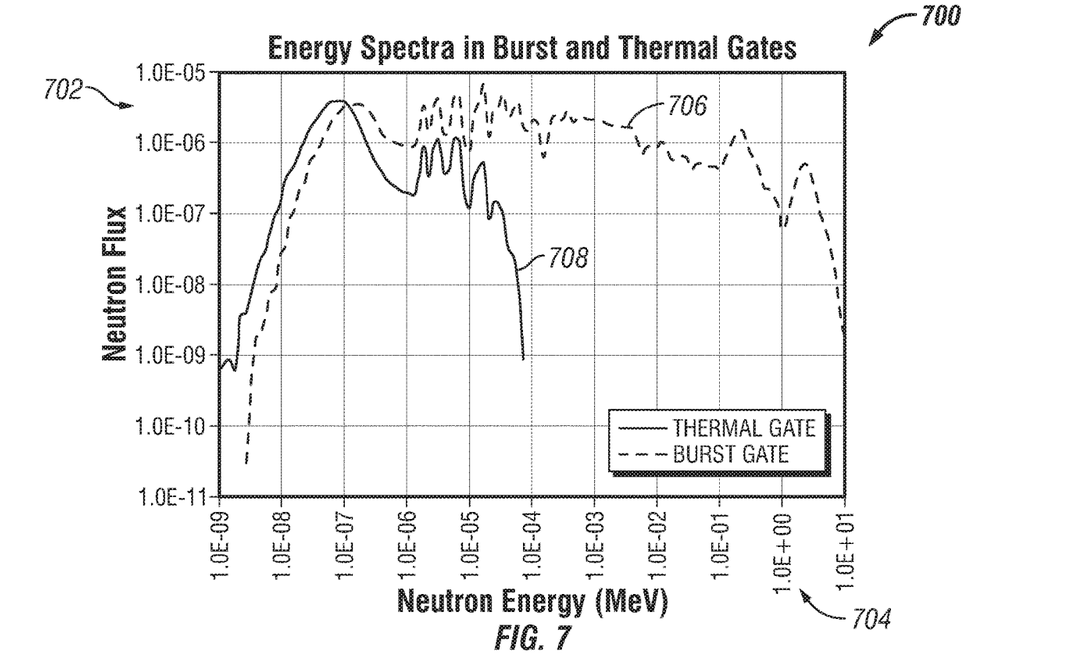
FIG. 7 is a plot illustrating the neutron flux with respect to neutron energy taken in the burst gate and thermal gate for a case in which there is no neutron shielding around the detector, in accordance with various embodiments.

FIG. 7 is a plot 700 illustrating the neutron flux 702 with respect to neutron energy 704 taken in the burst gate 706 and thermal gate 708 for a case in which there is no neutron shielding around the detector, such as the case of FIG. 6B. As shown, the burst gate spectrum 706 has a significant amount of neutrons beyond the thermal gate neutron spectrum 708 energy levels. If the cross sections shown in FIG. 4 have higher values for the matching energy ranges of those higher energy neutrons, there is a significant amount of such high neutron energy capture reactions resulting in the fourth component of the total gamma ray spectrum. When the thermal gate spectrum 708 is subtracted from the total, this component stays with the resulting spectrum, thereby degrading the quality of the resulting inelastic spectrum.

Figure 6C:
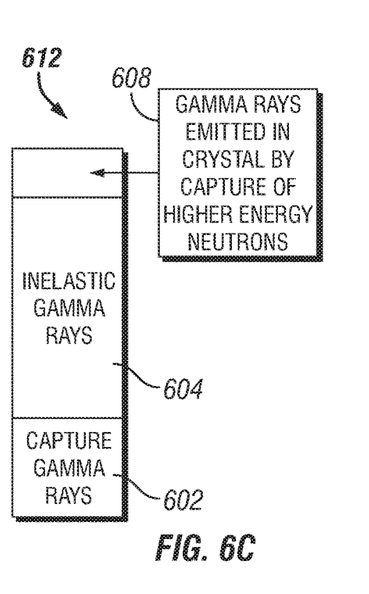
FIG. 6C is a graphical representation of another total spectrum that has crystal-born gamma components, in accordance with various embodiments.
Figure 8:
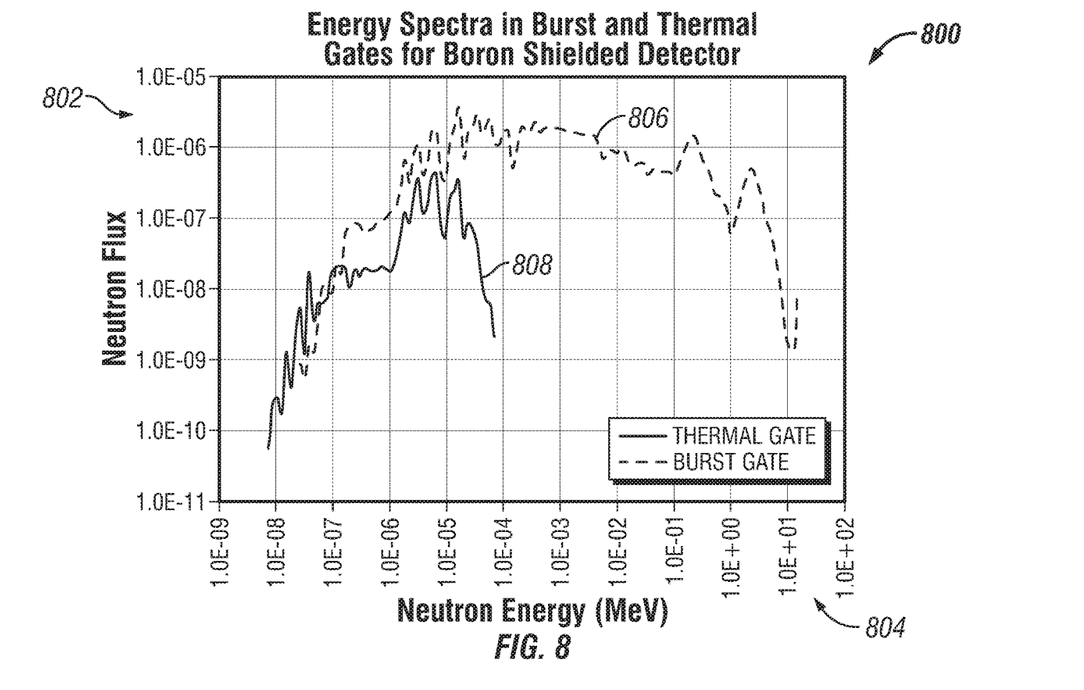
FIG. 8 is a plot illustrating the neutron flux with respect to neutron energy taken in the burst gate and thermal gate for the case of FIG. 6C in which the detector has been shielded with a lower energy neutron absorbing material, in accordance with various embodiments.

FIG. 6C shows a case where the detector has been shielded with a lower energy neutron absorbing material such as B-10, Li-6, etc. FIG. 8 is a plot 800 illustrating the neutron flux 802 with respect to neutron energy 804 taken in the burst gate 806 and thermal gate 808 for the case of FIG. 6C in which the detector has been shielded with a lower energy neutron absorbing material. In particular, the neutron flux below 1 eV range is heavily decimated. When compared to the unshielded case shown in FIG. 7, neutron flux is about two orders of magnitude smaller, or around the 0.025 eV range. In contrast, there is not much change with the higher energy section of the spectrum beyond a few eV. This implies that there will not be a significant amount of neutron capture reactions for lower energy neutrons, but the higher energy zone neutron capture will stay untouched. Referring to FIG. 6C, because of that, the total spectrum 612 is mainly a three component spectrum that includes capture gamma rays 602 and inelastic gamma rays 604 from outside the tool, and higher energy neutron induced gamma rays 608 born and detected in the crystal. The thermal gate neutron spectrum 808 has a very low level of lower energy neutrons and some higher energy neutrons. Accordingly, the amount of neutron induced gamma contribution to the thermal gate gamma ray spectrum 808 does not have many crystal-born gamma rays. When this spectrum is subtracted from the total spectrum 612 and multiplied by a scalar, the higher energy neutron capture components 608 will not be removed from the total spectrum 612, leading to a significant amount of pollution in the inelastic spectrum.

As described above, the thermal gate capture spectrum 808 does not have the contribution from the higher energy neutron capture gamma rays 608 born in the crystal. This forms the main challenge in getting a clean inelastic spectrum. For example, this issue may manifest as an increase in the gamma rays in the higher end of the measured spectrum. As shown in FIG. 5, Gd-157 has gamma emission lines 506 in that energy interval. The same can be said for the Lu nuclides as well. Accordingly, increasing higher energy neutron flux in the crystal increases the slope of the spectrum in the 3-7 MeV range.

Figure 9:
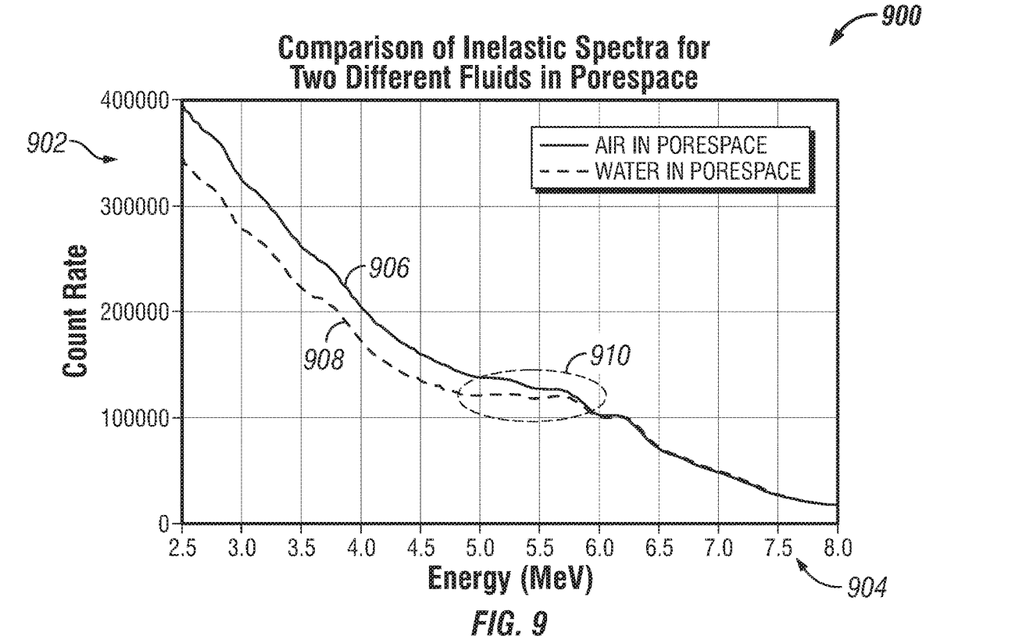
FIG. 9 is a plot illustrating gamma count rates with respect to energy for air in pore space and water in pore space of sandstone rock, in accordance with various embodiments.

For example, FIG. 9 is a plot 900 illustrating gamma count rates 902 with respect to energy 904 for air in pore space 906 and water in pore space 908 of sandstone rock. The porosity is similar for both cases, and carbon interference is negligible due to lack of carbon in the system. The change of the spectral slope within the marked region is very clear. With air in the pore space, the spectrum of the neutron flux incident on the crystal is difficult to measure compared to the case with water in the pore space. Water slows down neutrons and high energy neutron flux incident on the detector is smaller compared to the high energy neutron flux for the air in the borehole case. Thus, there is an increased amount of neutron capture gamma ray emission in the crystal in the air saturated pore space case. In the measured spectra, this shows up as an increase in the spectral slope in the encircled zone 910 in the plot.

The method for obtaining an inelastic spectrum free of the gamma rays born in the crystal requires two parameters. The first is the shape of the spectrum caused by the gamma rays emitted in the crystal. The second is how much of that spectrum needs to be subtracted to remove the crystal-born gamma ray contribution. The spectrum that will need to be subtracted can be written as follows: S(E) can take different forms. It can be a standalone spectrum to be subtracted from the total spectrum after the capture spectrum is removed after being multiplied by the scaler. Alternatively, the capture spectrum can be modified to include this S(E) and then the end result is taken off from the total spectrum to obtain the clean inelastic spectrum. $\alpha$ represents the crystal-born gamma ray scaler to be multiplied with the unit spectrum developed for the gamma rays born in the detector crystal.

Figure 10:
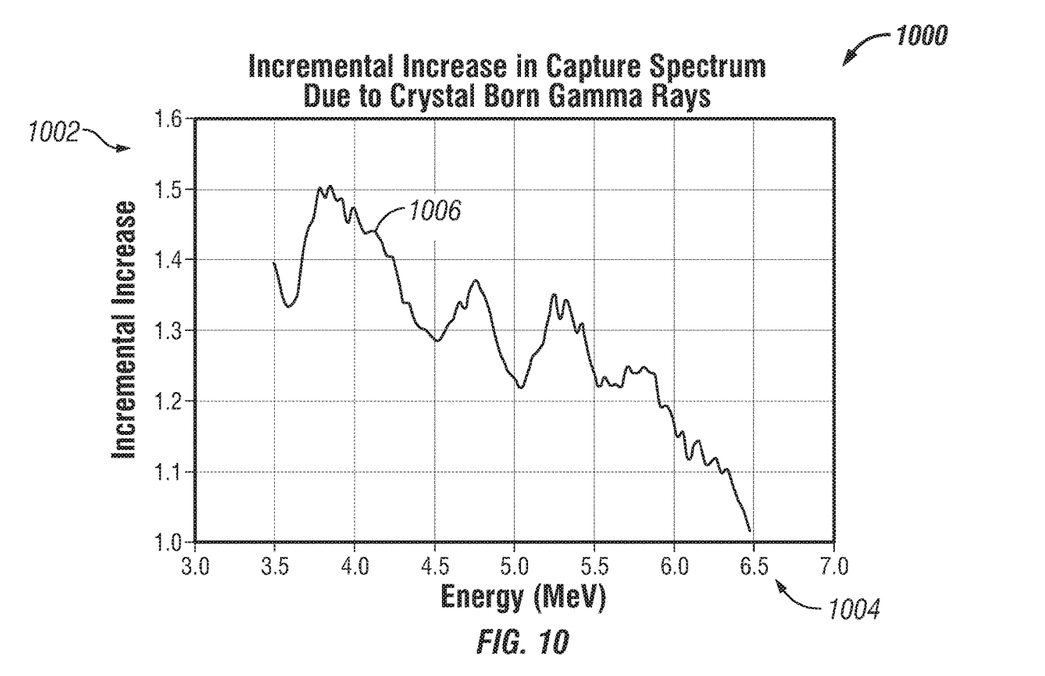
FIG. 10 is a plot illustrating incremental increase in capture spectrum due to crystal-born gamma rays with respect to energy, in accordance with various embodiments.

One way of determining the crystal-born gamma ray spectral shape, Ø(E), is through simulations. This usually requires neutron capture gamma ray emission cross sections. That data is not available for all nuclides. For nuclides for which no such cross sections are available for the simulation codes, Ø(E) can be obtained through experimentation. One such example is shown in FIG. 10, which is a plot 1000 illustrating incremental increase 1002 in capture spectrum due to crystal-born gamma rays with respect to energy 1004, as defined by line 1006.

The crystal-born gamma ray scaler, $\alpha$, varies with the properties of the neutron flux incident on the scintillation crystal. In turn, the neutron flux properties are determined by the formation, formation fluid, borehole, and borehole fluids. In general, increasing porosity in the formation increases the neutron slowing down, and the neutron flux incident on the scintillation crystal is softer. The opposite is true with decreasing porosity.

The fluid in the pore space can also have a strong influence. While water and oil in the pore space has similar impact, and can slow down the neutrons more to create a softer neutron flux incident on the crystal, any gas or air in the pore space reverses the influence, and the incident neutron flux will be harder. All that can be monitored through the spectral slope that is measured using the inelastic spectrum as shown in FIG. 9.

Figure 11:
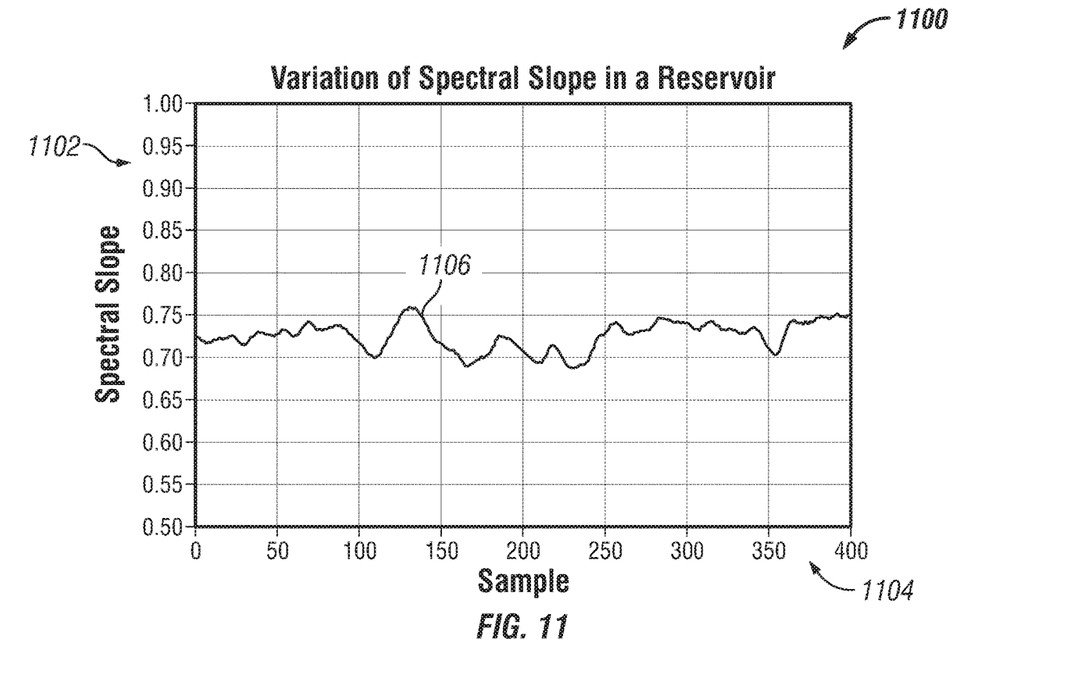
FIG. 11 is a plot illustrating spectral slope measured in a reservoir at various samples, in accordance with various embodiments.
Figure 12:
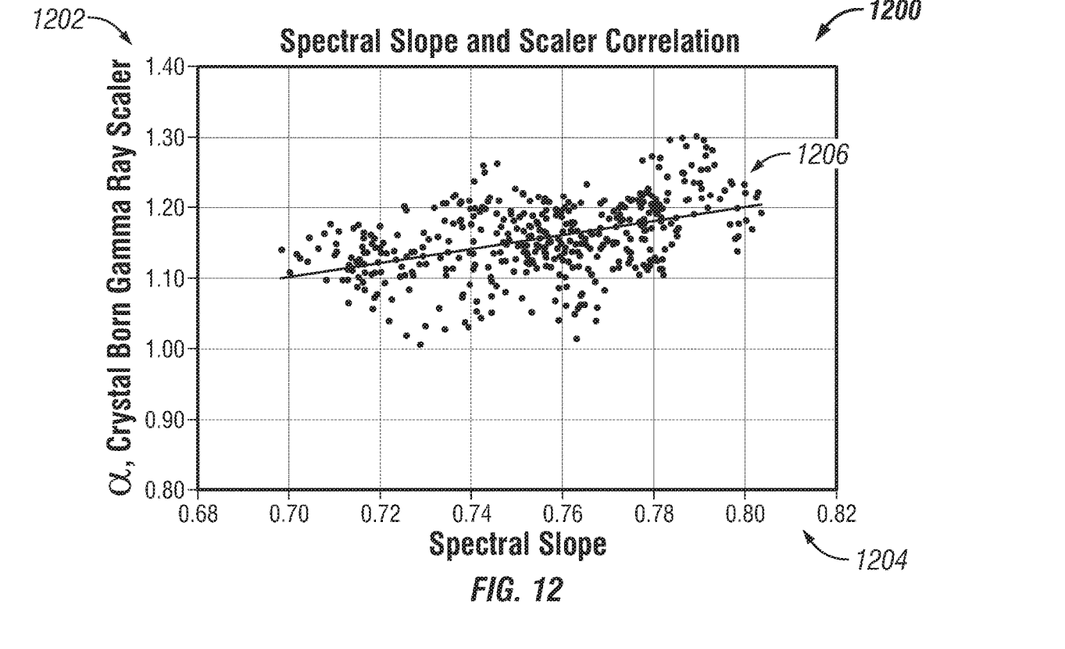
FIG. 12 is a plot illustrating a correlation between the crystal-born gamma ray scalar and spectral slope, in accordance with various embodiments.

One way of doing this is to compare the lower count rates to the higher counts in a region. FIG. 11 is a plot 1100 illustrating spectral slope 1102 measured in a reservoir at various samples 1104, defined by line 1106. The crystal-born gamma ray scaler, $\alpha$, can be correlated to the spectral slope 1102. The correlation shows itself as a linear correlation. For example, FIG. 12 is a plot 1200 illustrating a correlation 1206 between the crystal-born gamma ray scalar 1202 and spectral slope 1204. In addition to the spectral slope, burst slope and ratio of short space and long space counts can also be used as the gamma ray scaler, $\alpha$. When the neutron pulse comes on, the count rates increase as a function of time until the pulse is turned off. The slope of that variation can be correlated to the amount of correction to be used. The short and long space ratio is done on the basis of count rates recorded during the neutron burst. The ratio of those count rates is another way of predicting the amount of correction to be implemented.

In various embodiments, the methodology is based on determining spectral slope from the first iteration inelastic spectrum, then computing the crystal-born gamma ray scaler using this spectral slope and forming the spectrum to be subtracted from the measured spectra in addition to the capture spectrum and slower neutron induced gamma ray spectrum. Some of the variations in this overall methodology include how to obtain spectral shape, Ø(E). It can be obtained through simulations and/or experimental work. This is a function of the crystal material that captures neutrons and emits gamma rays. Another potential variation is about the nature of S(E). One form of this is to obtain a spectrum similar to capture spectrum and subtract that from the total before capture spectrum or subtract that from the inelastic later. S(E) can also be cast into an incremental change spectrum as shown in FIG. 10. For that case, the capture spectrum is modified by this spectrum and then a new inelastic spectrum can be obtained by using this modified capture spectrum and the total spectrum. Although this methodology is based on using spectral slope for quantifying the amount of additional subtraction, a near/far ratio methodology can also be fielded to determine the same quantity.

Figure 13:
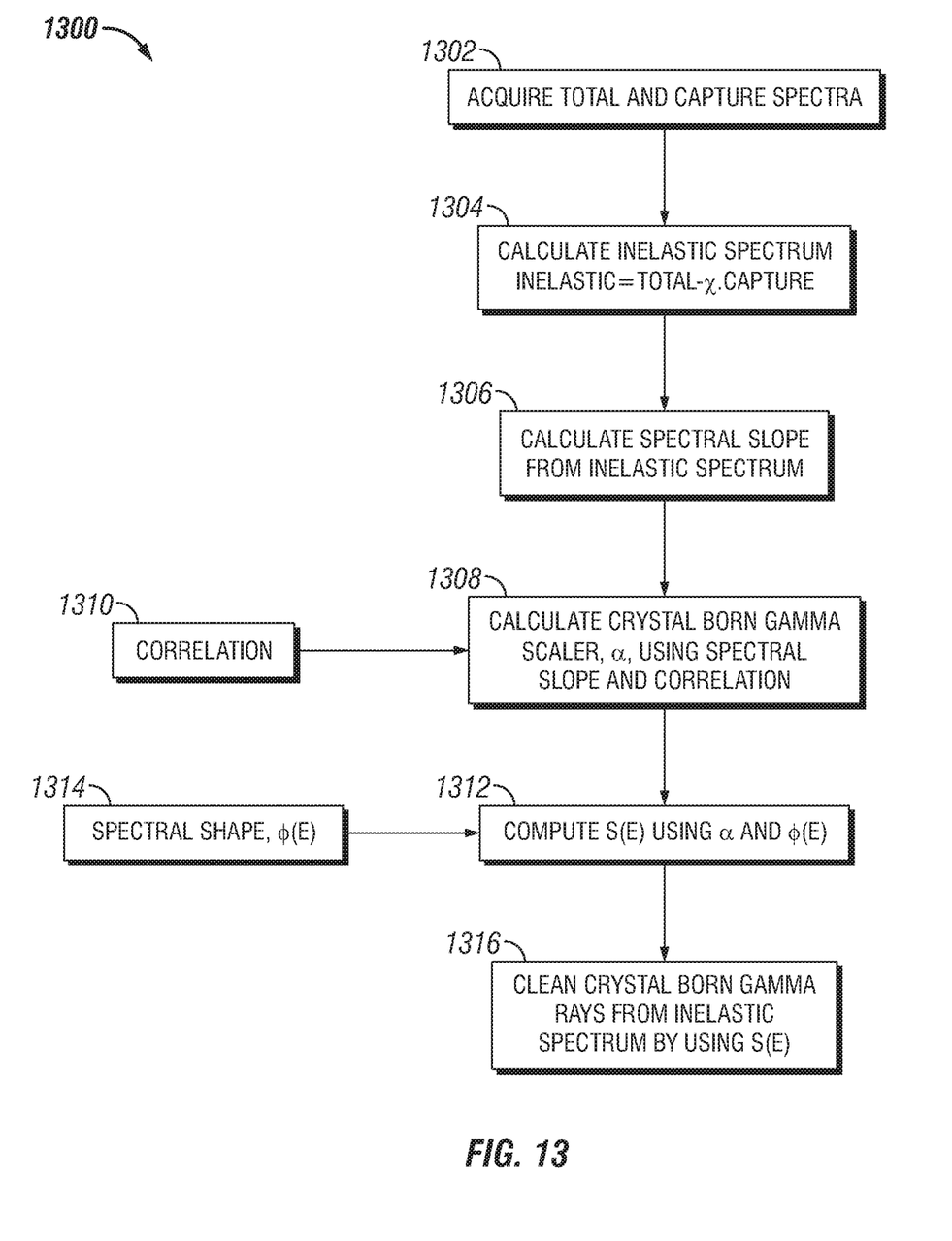
FIG. 13 illustrates a method of obtaining a clean inelastic spectrum free of crystal-born gamma rays, in accordance with various embodiments.

FIG. 13 illustrates a method 1300 of obtaining a clean inelastic spectrum free of crystal-born gamma rays, in accordance with various embodiments. In this example, the method 1300 includes acquiring 1302 a total gamma ray spectra and a capture gamma ray spectra. The total gamma ray spectra may be obtained by taking a first measurement at the detector during a first period of time, such as the burst gate. The capture gamma ray spectra may be obtained by taking a second measurement at the detector during a second period of time following the first period of time, such as the capture gate. The inelastic spectrum can then be calculated 1304 by subtracting or removing the capture gamma ray spectra from the total spectra, or removing the second measurement from the first measurement. The spectral slope can then be calculated 1306 from the inelastic spectrum. In some embodiments, this may be done by comparing the lower count rate in a specific segment of the inelastic spectrum to the higher count rate in a different segment of the inelastic spectrum. The higher count rate is computed by picking a certain zone of the inelastic spectrum and integrating the count rates over that zone. The lower count rate is computed by picking a different zone of the inelastic spectrum and integrating the count rates over that zone. Then a slope is calculated by the higher count rate and the lower count rate.

In some embodiments, a correlation 1310 between the spectral slope and a crystal-born gamma scaler may be provided, obtained, or determined. Thus, the crystal-born gamma scaler can be calculated 1308 using the correlation and the spectral slope. In some embodiments, a spectral shape 1314 associated with the particular crystal of the detector may be obtained or determined. Thus, the crystal-born gamma ray spectra can be calculated 1312 by applying the crystal-born gamma scaler to the spectral shape. One know, the crystal-born gamma ray spectra can then be removed 1316 from the total spectra.

In various embodiments, various instrumentation units and data collection units may be utilized that may include a digital and/or an analog system. For example, the tool that measures the spectrum and its associated analytical components may include digital and/or analog systems. Furthermore, various surface and wellbore components not illustrated for clarity may also use a variety of digital and/or analog systems. The system may have components such as a processor, storage media, memory, input, output, communications link (wired, wireless, optical or other), user interfaces (e.g., a display or printer), software programs, signal processors (digital or analog) and other such components (such as resistors, capacitors, inductors and others) to provide for operation and analyses of the systems and methods disclosed herein. It is considered that these teachings may be, but need not be, implemented in conjunction with a set of computer executable instructions stored on a non-transitory computer readable medium, including memory (ROMs, RAMs), optical (CD-ROMs), or magnetic (disks, hard drives), or any other type that when executed causes a computer to implement the method of the present invention. These instructions may provide for equipment operation, control, data collection and analysis and other functions deemed relevant by a system designer, owner, user or other such personnel, in addition to the functions described in this disclosure.

Further, various other components may be included and called upon for providing for aspects of the teachings herein. For example, a power supply (e.g., at least one of a generator, a remote supply and a battery, magnet, electromagnet, sensor, electrode, transmitter, receiver, transceiver, antenna, controller, optical unit, electrical unit or electromechanical unit) may be included in support of the various aspects discussed herein or in support of other functions beyond this disclosure.

Although the technology herein has been described with reference to particular embodiments, it is to be understood that these embodiments are merely illustrative of the principles and applications of the present technology. It is therefore to be understood that numerous modifications may be made to the illustrative embodiments and that other arrangements may be devised without departing from the spirit and scope of the present technology as defined by the appended claims.

The invention claimed is:

1. A method of measuring properties of a formation or well structure, comprising:
    receiving a first measurement of gamma rays from the formation or well structure via a detector during a first period of time;
    receiving a second measurement of gamma rays from the formation or well structure via the detector during a second period of time;
    removing the second measurement from the first measurement to produce an inelastic spectrum;
    determining a spectral slope from the inelastic spectrum;
    determining a scaling factor based on the spectral slope;
    determining a spectral shape associated with the detector;
    determining a detector-induced spectrum by applying the scaling factor to the spectral shape; and
    removing the detector-induced spectrum from the inelastic spectrum to produce a clean inelastic spectrum for use in evaluating properties of the formation or well structure.

2. The method of claim 1, wherein the first period of time corresponds to a burst gate and the first measurement corresponds to a total spectrum.

3. The method of claim 1, wherein the second period of time corresponds to a capture gate and the second measurement corresponds to capture gamma rays.

4. The method of claim 1, further comprising:
    determining a higher gamma count rate from a first segment of a gamma ray spectrum;
    determining a lower gamma count rate from a second segment of the gamma ray spectrum;
    comparing the higher count rate and the lower count rate to determine the spectral slope.

5. The method of claim 1, further comprising:
    obtaining a correlation between the spectral slope and the scaling factor.

6. The method of claim 1, wherein the detector comprises a crystal, and the detector-induced spectrum is associated with characteristics of the crystal.

7. A computing device for measuring properties of a formation or well structure, comprising:
    a microprocessor; and
    memory including instructions that, when executed by the microprocessor, cause the computing device to:
        receive a first measurement of gamma rays from the formation or well structure via a detector during a first period of time;
        receive a second measurement of gamma rays from the formation or well structure via the detector during a second period of time;
        remove the second measurement from the first measurement to produce an inelastic spectrum;
        determine a spectral slope from the inelastic spectrum;
        determine a scaling factor based on the spectral slope;
        determine a spectral shape associated with the detector;
        determine a detector-induced spectrum by applying the scaling factor to the spectral shape; and
        remove the detector-induced spectrum from the inelastic spectrum to produce a clean inelastic spectrum for use in evaluating properties of the formation or well structure.

8. The computing device of claim 7, wherein the first period of time corresponds to a burst gate and the first measurement corresponds to a total spectrum.

9. The computing device of claim 7, wherein the second period of time corresponds to a capture gate and the second measurement corresponds to capture gamma rays.

10. The computing device of claim 7, wherein the instructions, when executed by the microprocessor, further cause the computing device to:
    determining a higher gamma count rate from a first segment of a gamma ray spectrum;
    determining a lower gamma count rate from a second segment of the gamma ray spectrum; and
    compare the higher count rate and the lower count rate to determine the spectral slope.

11. The computing device of claim 7, wherein the instructions, when executed by the microprocessor, further cause the computing device to:
    obtain a correlation between the spectral slope and the scaling factor.

12. The computing device of claim 7, wherein the detector comprises a crystal, and the detector-induced spectrum is associated with characteristics of the crystal.

13. A system for conducting measurement operations for measuring properties of a formation or well structure, the system comprising:
    a neutron measurement device forming at least a portion of a downhole tool string, the neutron measurement device operable to generate measurement data for detecting a wellbore characteristic, wherein the neutron measurement device comprises:
        a neutron generation unit operable to emit neutrons toward a target;
        a detector unit fixed relative to the neutron generator and operable to detect gamma rays from the target;

a microprocessor; and memory including instructions that, when executed by the microprocessor, cause the system to:

receive a first measurement of gamma rays from the formation or well structure via a detector during a first period of time;

receive a second measurement of gamma rays from the formation or well structure via the detector during a second period of time;

remove the second measurement from the first measurement to produce an inelastic spectrum;

determine a spectral slope from the inelastic spectrum;

determine a scaling factor based on the spectral slope;

determine a spectral shape associated with the detector;

determine a detector-induced spectrum by applying the scaling factor to the spectral shape; and remove the detector-induced spectrum from the inelastic spectrum to produce a clean inelastic spectrum for use in evaluating properties of the formation or well structure.

14. The system of claim 13, wherein the first period of time corresponds to a burst gate and the first measurement corresponds to a total spectrum.

15. The system of claim 13, wherein the second period of time corresponds to a capture gate and the second measurement corresponds to capture gamma rays.

16. The system of claim 13, wherein the instructions, when executed by the microprocessor, further cause a computing device to:

determining a higher gamma count rate from a first segment of a gamma ray spectrum;

determining a lower gamma count rate from a second segment of the gamma ray spectrum; and compare the higher count rate and the lower count rate to determine the spectral slope.

17. The system of claim 13, wherein the instructions, when executed by the microprocessor, further cause a computing device to:

obtain a correlation between the spectral slope and the scaling factor.

18. The system of claim 13, wherein the detector comprises a crystal, and the detector-induced spectrum is associated with characteristics of the crystal.

19. The system of claim 13, wherein the neutron generation unit is a pulsed neutron generator.

20. The system of claim 13, wherein the detector unit includes at least one gamma ray detector.

* * * * *